United States Patent [19]

Stich et al.

[11] Patent Number: 4,641,547
[45] Date of Patent: Feb. 10, 1987

[54] AUTOMATIC TRANSMISSION ADAPTER KIT

[76] Inventors: Roger L. Stich, 6500 NW. Grand, #143, Oklahoma City, Okla. 73116; William D. Neal, 920 W. Main, Moore, Okla. 73160

[21] Appl. No.: 527,273

[22] Filed: Aug. 29, 1983

[51] Int. Cl.4 .............................................. F16H 57/02
[52] U.S. Cl. ................................................. 74/606 R
[58] Field of Search ................. 74/606 R, 15.86, 15.8, 74/11; 123/DIG. 6, DIG. 7; D15/148, 149; 403/3, 4, 336, 337

[56] References Cited

U.S. PATENT DOCUMENTS

| | | | |
|---|---|---|---|
| D. 237,900 | 12/1975 | Stroup | D15/149 |
| 2,950,635 | 8/1960 | Bieger et al. | 74/801 |
| 3,075,690 | 1/1963 | Luenberger | 74/606 |
| 3,102,432 | 9/1963 | Gerst | 74/606 |
| 3,872,939 | 3/1975 | Eckert | 74/606 R |
| 4,174,013 | 11/1979 | Yago | 180/6.2 |
| 4,226,200 | 10/1980 | Morisawa et al. | 74/606 R |
| 4,441,378 | 4/1984 | Ponczek | 74/606 R |
| 4,478,593 | 10/1984 | Brown | 464/182 |

FOREIGN PATENT DOCUMENTS 1068405 5/1967 United Kingdom ................. 74/606

OTHER PUBLICATIONS

J. C. Whitney & Co–Parts and Accessories, 1981, p. 163 "Engine to Transmission Adapters".
Page 52 of Unidentified Maintenance Manual for General Motors Four-Wheel-Drive Vehicles.

Primary Examiner—Lawrence Staab
Attorney, Agent, or Firm—Laney, Dougherty, Hessin & Beavers

[57] ABSTRACT

Method and apparatus for installing a replacement automatic transmission in place of an original automatic transmission in a four-wheel-drive vehicle, said replacement automatic transmission being of shorter overall length than said original transmission. An adapter kit, comprising an extension housing, an output shaft, fastening means and sealing means is installed in the drive train of the four-wheel-drive vehicle, rendering this substitution possible.

29 Claims, 12 Drawing Figures

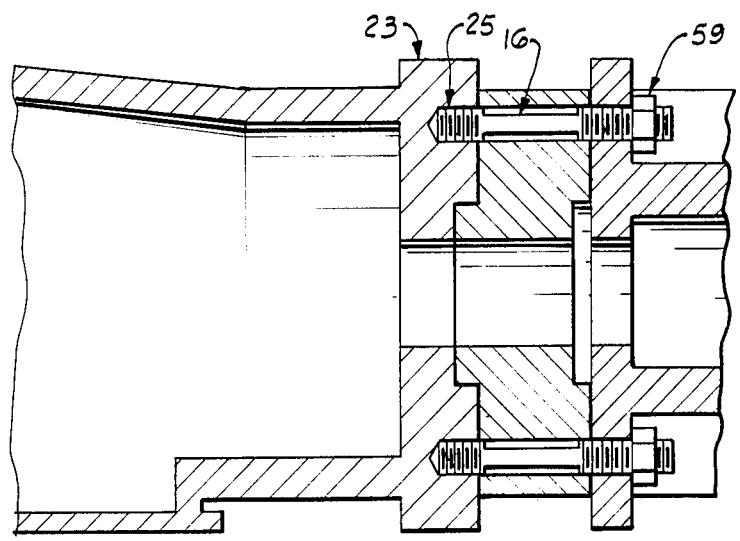
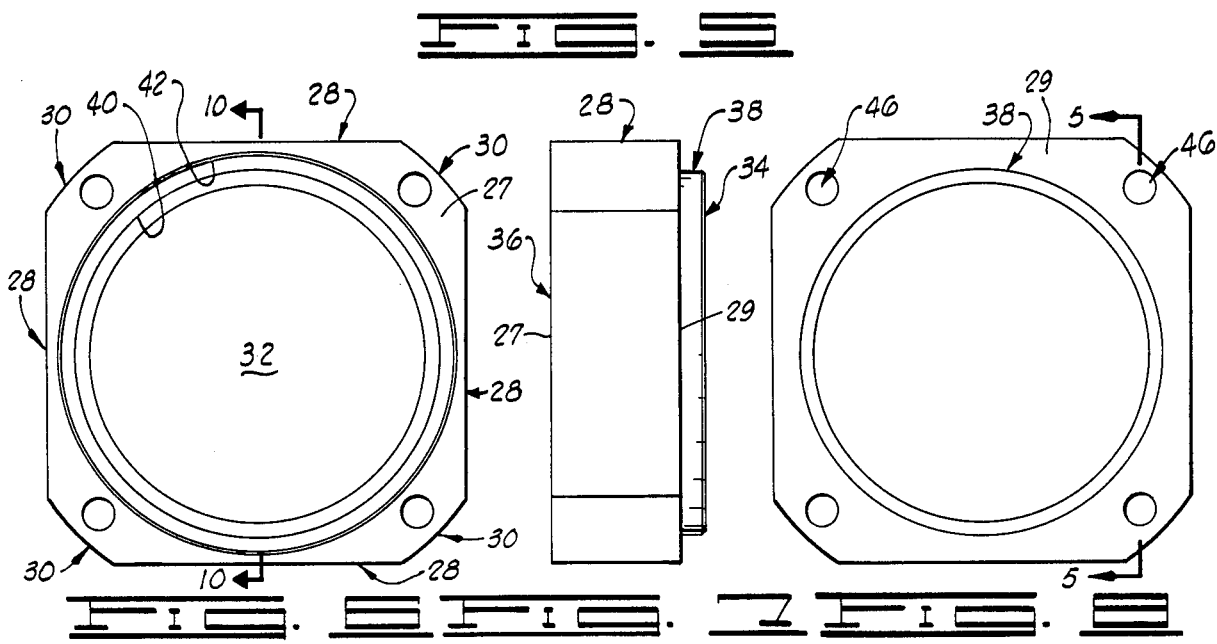
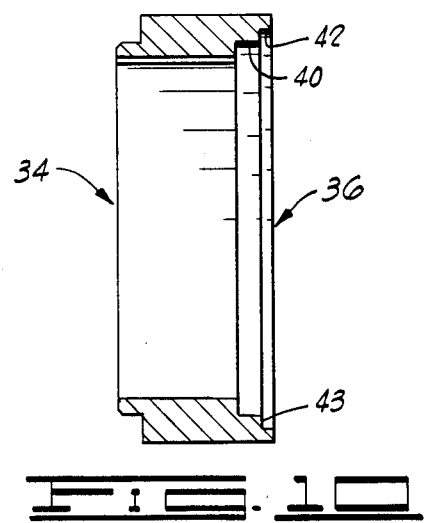
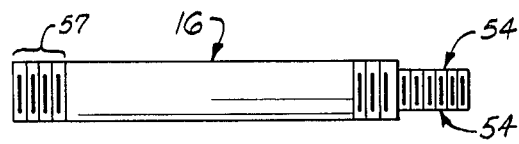
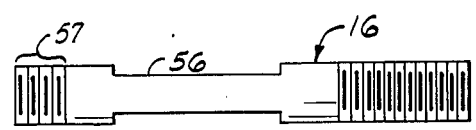

AUTOMATIC TRANSMISSION ADAPTER KIT

BACKGROUND OF THE INVENTION

1. Field Of The Invention

This invention relates in general to automatic transmission kits for adapting automatic transmissions to various automotive applications; and more particularly, for adapting automatic transmissions having a shorter overall length than original automatic transmissions, for installation in four-wheel-drive vehicles.

2. Description Of The Prior Art

The recent automotive trends of "downsizing" and increased emphasis on minimizing vehicle weight have resulted in the design and utilization of generally lighter-duty components in automotive applications. A specific example of the utilization of such a lighter-duty component is the General Motors Type 700-R4 automatic transmission, hereafter 700 transmission. Beginning in model year 1982, General Motors began using this 700 transmission in both two- and four-wheel-drive one-half- and three-quarter-ton pickup trucks, Camaros, Corvettes, and Impala Station Wagons. Previous to introduction of the 700 transmission, General Motors used an automatic transmission in the aforementioned applications known as the Turbo-Hydramatic 350.

Soon after introduction of the 700 transmission line, durability problems were experienced in the field. Specifically, a substantial number of premature failures were noted with 700 series transmissions. Although these problems were experienced in all of the aforementioned 700 transmission applications, premature failure has been especially troublesome in four-wheel-drive applications of the 700 transmission.

As a result of these problems, demand exists currently among owners of late-model four-wheel-drive vehicles having a 700 transmission to install a substitute transmission. The aforementioned problems associated with the 700 transmission in four-wheel-drive applications were not experienced when the General Motors Turbo-Hydramatic 350 automatic transmission was used in these applications. The present invention provides a system whereby the Turbo-Hydramatic 350 can be substituted for the 700 transmission.

The four-wheel-drive vehicles currently having the 700 transmission in their drive line were redesigned in many other respects also. For example, overall drive line length has been changed, new transfer cases are employed, vehicle body configuration has been changed in that the current generation of four-wheel-drive vehicles is much smaller in size than its predecessors. For these reasons, installing the previously used Turbo-Hydramatic 350 transmission as a substitute for the original equipment 700 transmission is not a simple bolt-in operation. In addition, easy substitution of the transmissions is precluded by the fact that the Turbo-Hydramatic 350 is inches shorter than the 700 transmission.

SUMMARY OF THE INVENTION

The present invention provides a very satisfactory system for substituting a Turbo-Hydramatic 350 transmission for a 700 transmission in a four-wheel-drive vehicle. An output shaft of specified length is provided for installation in the replacement Turbo-Hydramatic 350 automatic transmission. Also included in the instant invention is an extension housing, for attachment to the rear of the replacement Turbo-Hydramatic 350 automatic transmission. Seals are used to seal between the extension housing and the replacement automatic transmission and the extension housing and the transfer case spacer support. These seals may be of various configuration, however, flat gasket seals cut to conform with the shape of the extension housing, or elastomeric O-rings are suitable. Four studs which are threaded on both ends, and which have wrench flats disposed along their shank portion or on a threaded end, are utilized to fasten the extension housing between the replacement Turbo-Hydramatic 350 automatic transmission and the transfer case.

It is accordingly an object of the present invention to provide the means for substituting a Turbo-Hydramatic 350 automatic transmission in four-wheel-drive applications wherein a 700 series automatic transmission is original equipment.

It is also an object of the present invention to render the substitution of a Turbo-Hydramatic 350 transmission for a 700 transmission, a relatively fast and thereby labor cost-efficient operation.

It is also an object of the present invention to improve the reliability of late-model four-wheel-drive vehicles by enabling the economical substitution of a more durable automatic transmission for the less durable and reliable 700 series transmission.

Other and further objects, features, and advantages of the present invention will be readily apparent to those skilled in the art when the following description of the preferred embodiment is read in conjunction with the accompanying drawings.

BRIEF DESCRIPTION OF THE DRAWINGS

FIG. 5 is a side elevation, partly sectioned view of the extension housing and fastening means of the instant invention as installed, taken along line 5—5 of FIG. 8.

FIG. 6 is a front elevational view of the spacer housing of the instant invention.

FIG. 7 is a side elevational view of the spacer housing of the instant invention.

FIG. 8 is a rear elevational view of the spacer housing of the instant invention.

FIG. 9 is a view of a fastening stud of the instant invention.

FIG. 10 is a side elevation, partly sectioned view of the extension housing of FIG. 6, taken along line 10—10 of FIG. 6.

FIG. 11 is a view of an alternative embodiment of a fastening stud of the instant invention.

FIG. 12 is a side elevation of the output shaft of the instant invention.

DETAILED DESCRIPTION OF THE PREFERRED EMBODIMENTS

Figure 1:
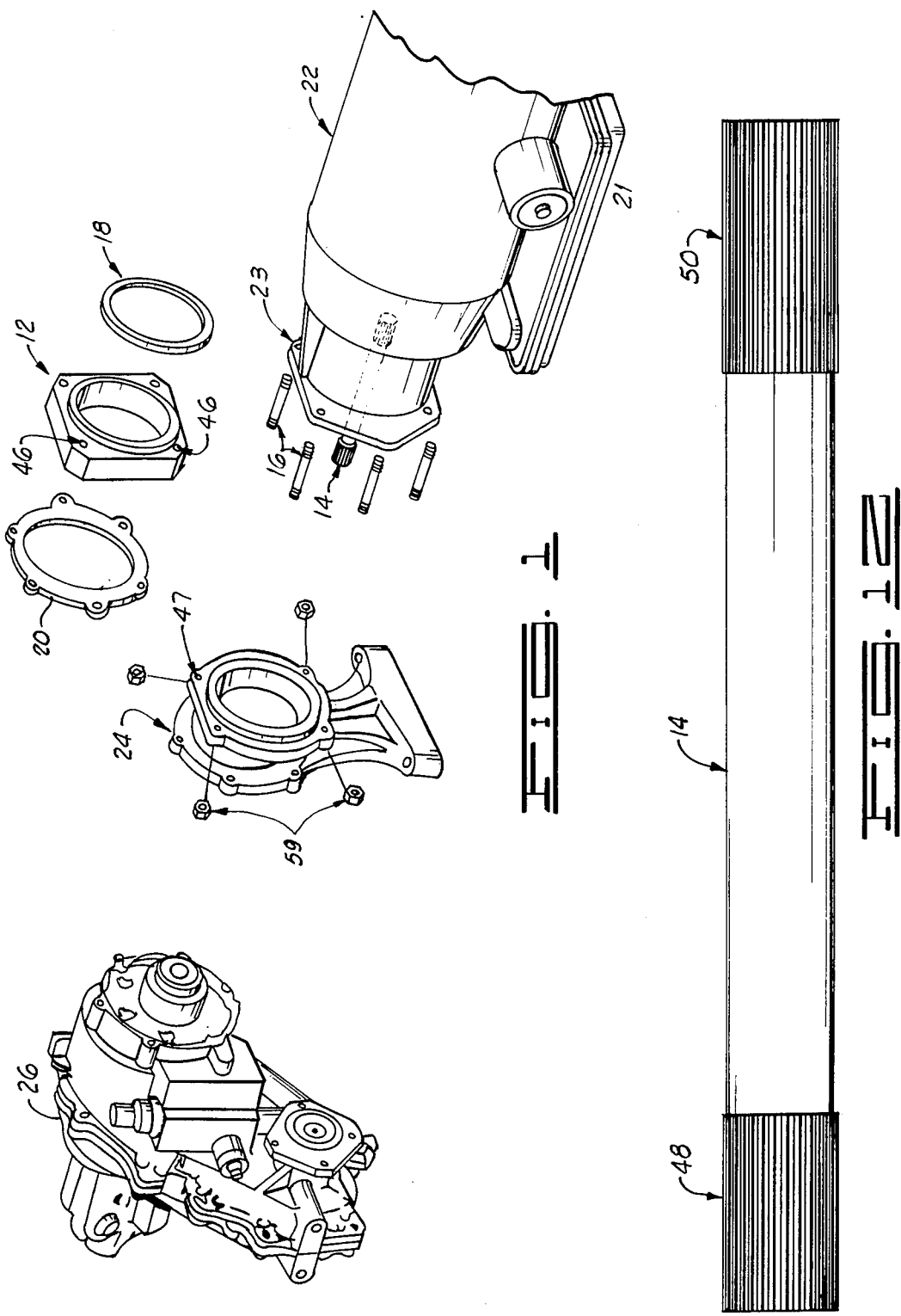
FIG. 1 is an exploded perspective view of the present invention in operative relationship with a Turbo-Hydramatic 350 automatic transmission, a transfer case spacer support, and a transfer case.

Referring now to the drawings, and particularly to FIG. 1, the automatic transmission adapter kit of the present invention is generally shown in exploded physical relationship to those components of a four-wheel-drive vehicle to which it attaches. The adapter kit comprises an extension housing 12, an output shaft 14, a set of four studs 16, an O-ring seal 18, and a gasket seal 20. Also shown in FIG. 1 is a replacement automatic transmission 22, a transfer case spacer support 24, and a transfer case 26.

Referring now also to FIGS. 6, 7 and 8, the extension housing 12 of the instant invention has four sides 28 of equal length, which sides are joined by four beveled corners 30. The corners 30 are beveled in order to provide clearance between the extension housing 12 and other four-wheel-drive vehicle components. The sides 28 join two substantially square vertical faces 27 and 29.

The extension housing 12 has a passageway 32 centrally located between the sides 28. The passageway 32 has first and second open ends 34 and 36, respectively.

Figure 4:
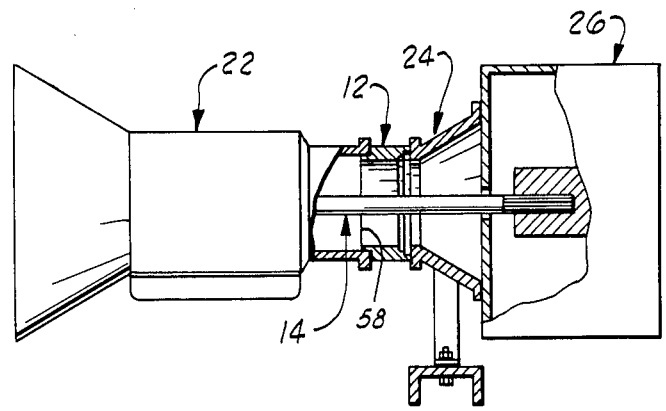
FIG. 4 is a schematic side elevational view of the device of FIG. 3, having a partial cross-section.

Adjacent first open end 34 a circular flange 38 protrudes outward from face 29. Flange 38 fits into an opening 58 (see FIG. 4) in the end of the replacement automatic transmission 22, i.e., a Turbo-Hydramatic 350 automatic transmission.

The second open end 36 has first and second enlarged diameter counterbores 40 and 42, respectively. The first counterbore 40 forms an enlarged opening having a diameter of substantially 4.765 inches for closely receiving and accurately aligning the transfer case spacer support 24. The second counterbore 42 in combination with the first counterbore are joined by an annular face or platform 43.

The spacer housing 12 has an opening 46 disposed therethrough adjacent each beveled corner 30.

Referring back to FIG. 1, the adapter kit of the instant invention includes the output shaft 14. The output shaft 14 has a length of substantially 14.0 inches. Referring to FIG. 12, the output shaft 14 has a first splined end 48 and a second splined end 50.

Two embodiments of fastening studs 16, either of which may be used by the instant invention, are shown at FIG. 9 and FIG. 11. FIG. 9 shows a fastening stud 16 having two opposed wrench flats 54 disposed on one of the threaded ends thereof. FIG. 11 shows a fastening stud 16 having wrench flats 56 disposed between the first and second threaded ends thereof. Also, a forwardmost threaded portion 57 of studs 16 has a maximum length of about ⅞" to prevent it from bottoming out in threaded openings 25 (see FIG. 5) to prevent the possibility of breaking flange 23 of the transmission 22 by overtightening of studs 16.

When installed in a four-wheel-drive vehicle, the extension housing 12 is interposed, along with transfer case spacer support 24, between the replacement automatic transmission 22 and the transfer case 26. It is noted that the extension housing 12 is actually physically attached to the replacement automatic transmission 22 and the transfer case spacer support 24, but still it is located between the transmission 22 and transfer case 26.

The transfer case spacer support 24 can structurally be considered to be a part of the transfer case 26, since the two are rigidly bolted together. Thus the seal 20, which actually engages transfer case spacer support 24 and extension housing 12, can be said to be a sealing means 20 for sealing between extension housing 12 and transfer case 26.

The output shaft 14 extends rearward through a rear opening 58 of said automatic transmission 22, passing through the passageway 32 in said extension housing 12 and connecting with the transfer case 26. Sealing means, either gaskets or elastomeric O-rings, or a combination of the two, are interposed between the replacement automatic transmission 22 and the extension housing 12 and the transfer case spacer support 24 and the extension housing 12.

Fastening studs 16 extend from a rear flange 23 of replacement automatic transmission 22 through openings 46 in the extension housing 12 to the spacer support 24. The fastening studs 16 are retained in the spacer support 24 by nuts 59. Lock washers (not shown) are used with nuts 59.

The instant invention allows for the replacement of a series 700 automatic transmission in a four-wheel-drive vehicle by a Turbo-Hydramatic 350 automatic transmission, which is of a shorter overall length than the 700 series transmission. This substitution is accomplished by installing the adapter kit of the instant invention in the following manner.

Figure 2:
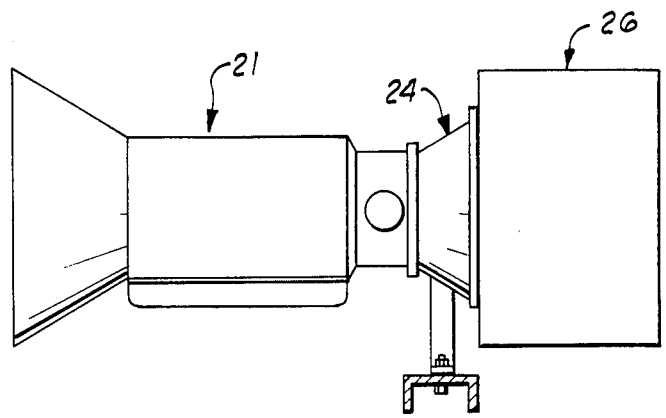
FIG. 2 is a schematic side elevational view of a 700 series automatic transmission, a transfer case spacer support, and a transfer case, as installed in four-wheel-drive vehicles by the manufacturer.
Figure 3:
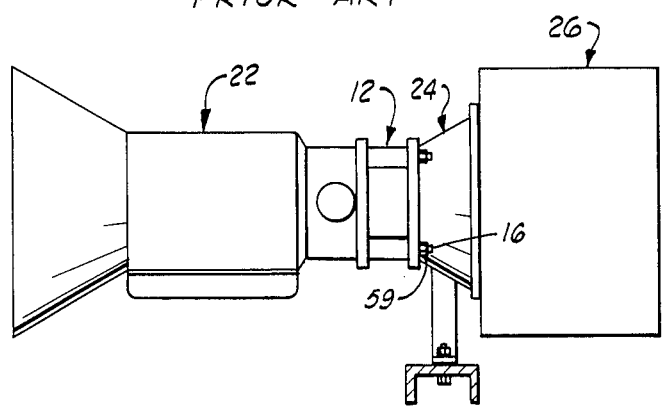
FIG. 3 is a schematic side elevational view of the instant invention as used to install a Turbo-Hydramatic 350 automatic transmission in a four-wheel-drive vehicle.

First, it is necessary to remove the 700 series transmission. Referring now to FIG. 2, this is easiest accomplished by removing the transfer case 26, the transfer case spacer support 24 and the original automatic transmission 21 as an assembly. Upon removal, the original automatic transmission 21 should be unbolted and separated from the transfer case spacer support 24. It should be noted that the transfer case 26 and the transfer case spacer support 24 remain fastened together. Thereupon, the output shaft 14 is installed in the replacement automatic transmission 22. The four fastening studs 16 are then threaded into threaded openings 25 (see FIG. 5) disposed in the rear flange 23 of the replacement automatic transmission such that said fastening studs 16 extend horizontally to the rear of said replacement automatic transmission 22. The extension housing 12 is then placed on said fastening studs 16 by aligning openings 46 in said extension housing 12 with said studs 16 and sliding said extension housing 12 onto said fastening studs 16 until said fastening studs 16 protrude through the openings 46 in said extension housing 12.

The transfer case spacer support 24 and the transfer case 26, which are still joined together, are then joined to the replacement automatic transmission 22 by aligning openings 47 in the transfer case spacer support 24 with the fastening studs 16, which fastening studs 16 now protrude through the extension housing 12. Once aligned, the fastening studs 16 are inserted through the spacer support openings 47 and nuts 59 are used to secure fastening studs 16 to the spacer support 24, by threading said nuts 59 onto the fastening studs 16.

The O-ring seal 18 and gasket seal 20 are installed adjacent the first open end 34 and the second open end 36, respectively, of the extension housing 12 before said extension housing 12 is installed on said fastening studs 16 in the foregoing method.

The assembly comprising the transfer case 26, the transfer case spacer support 24, the replacement automatic transmission 22, having output shaft 14 installed therein, and extension housing 12 are installed in the four-wheel-drive vehicle, completing the substitution procedure.

In the above manner, the instant invention allows for the substitution of a Turbo-Hydramatic 350 automatic transmission in place of a 700 series transmission, in four-wheel-drive applications. An important feature of the instant invention is its simplicity and attending ease of installation. Through use of the instant invention, a heavier duty automatic transmission can be installed in four-wheel-drive vehicles with no need for cutting, welding or any other major modification to the four-wheel-drive vehicle itself.

Thus, the automatic transmission adapter kit of the present invention is well suited to achieve the objects and advantages mentioned in addition to those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

The foregoing disclosure and the showing made in the drawings are merely illustrative of the principles of this invention and are not to be interpreted in a limiting sense.

What is claimed is:

1. In a four-wheel-drive vehicle apparatus having a power train including an automatic transmission and a transfer case, an automatic transmission adapter kit for installation of a replacement automatic transmission of shorter length than an original automatic transmission in said four-wheel-drive vehicle, comprising:
    - an extension housing interposed between said replacement automatic transmission and said transfer case;
    - an output shaft, having a first end which engages said replacement automatic transmission and a second end which engages said transfer case;
    - first sealing means for sealing between said extension housing and said replacement automatic transmission;
    - second sealing means for sealing between said extension housing and said transfer case; and
    - fastening means for connecting said extension housing between said replacement automatic transmission and said transfer case.

2. The apparatus of claim 1, wherein: said extension housing is manufactured of aluminum.

3. The apparatus of claim 1, wherein: said extension housing has four sides of equal length adjoining two substantially square vertical faces.

4. The apparatus of claim 3, wherein: said extension housing has corners formed by the intersection of any two sides, said corners being beveled in order to provide clearance between said extension housing and said four-wheel-drive vehicle.

5. The apparatus of claim 3, wherein: said extension housing has a passageway disposed therethrough, said passageway having first and second open ends centered on said substantially square faces, so that said shaft may be extended through said passageway.

6. The apparatus of claim 5, wherein: said first and second open ends of said passageway are circular.

7. The apparatus of claim 6, wherein: said extension housing has a circular flange protruding outwardly from one of said substantially square vertical faces along the circumference of said first end of said passageway for closely fitting with said replacement automatic transmission.

8. The apparatus of claim 6, wherein: said passageway of said extension housing has first and second enlarged diameter counterbores at said second open end thereof.

9. The apparatus of claim 8, wherein: said first counterbore forms an alignment opening of substantially 4.765 inches diameter for closely receiving and accurately aligning said transfer case.

10. The apparatus of claim 1, wherein: said extension housing has a plurality of openings, one of which is disposed at each corner thereof, which openings horizontally extend therethrough for accepting said fastening means.

11. The apparatus of claim 1, wherein: said output shaft has a first splined end for engaging said replacement automatic transmission and a second splined end for engaging said transfer case.

12. The apparatus of claim 1, wherein: said output shaft has a length of substantially 14.0 inches.

13. The apparatus of claim 1, wherein: said fastening means includes a plurality of studs, each having a first and second threaded end.

14. The apparatus of claim 13, wherein: each of said studs has wrench flats disposed between said first and said second ends.

15. Apparatus for installing a replacement automatic transmission of shorter overall length than an original equipment transmission in a four-wheel-drive vehicle, comprising:
    - an extension housing, adapted to be interposed between said replacement automatic transmission and a transfer case of said vehicle;
    - an output shaft having a first end adapted to engage said replacement automatic transmission and a second end adapted to engage said transfer case;
    - first sealing means for sealing between said extension housing and said replacement automatic transmission;
    - second sealing means for sealing between said extension housing and said transfer case; and
    - fastening means for fastening said extension housing between said replacement automatic transmission and said transfer case.

16. The apparatus of claim 15, wherein: said extension housing has four sides of substantially equal length joining two substantially square faces.

17. The apparatus of claim 16, wherein: said extension housing has corners formed by the intersection of any two sides, said corners being beveled in order to provide clearance between said spacer housing and said four-wheel-drive vehicle.

18. The apparatus of claim 16, wherein: said extension housing has a passageway disposed therethrough, said passageway having first and second open ends centered on said substantially square faces, so that said shaft may be extended through said passageway.

19. The apparatus of claim 18, wherein: said first and second open ends of said passageway are circular.

20. The apparatus of claim 19, wherein: said extension housing has a circular flange protruding outwardly from one of said substantially square vertical faces along the circumference of said first end of said passageway for closely fitting with said replacement automatic transmission.

21. The apparatus of claim 19, wherein:
said passageway of said extension housing has first and second enlarged diameter counterbores at said second open end thereof for fitting said extension housing to said transfer case.

22. The apparatus of claim 21, wherein:
said first counterbore forms an enlarged diameter of substantially 4.765 inches.

23. The apparatus of claim 15, wherein:
said spacer housing has a plurality of openings, one of which is disposed at each corner thereof, which openings extend horizontally therethrough so that said fastening means may be extended through said openings.

24. The apparatus of claim 15, wherein:
said shaft has a length of substantially 14.0 inches.

25. The apparatus of claim 15, wherein:
said shaft has a splined first end and a splined second end.

26. The apparatus of claim 15, wherein:
said fastening means includes four studs having first and second threaded ends and wrench flats disposed between said first and second threaded ends.

27. A method of replacing a first automatic transmission in a four-wheel-drive vehicle with a second automatic transmission of shorter length, comprising:
removing from said four-wheel-drive vehicle, as an assembly, said first automatic transmission, a transfer case spacer support and a transfer case;
unbolting and separating said first automatic transmission from said transfer case spacer support, leaving said transfer case spacer support fastened to said transfer case;
installing an output shaft having a length of substantially 14.0 inches in said second automatic transmission;
installing a plurality of studs having first and second threaded ends into a plurality of threaded openings disposed in a rear portion of said second automatic transmission such that said studs extend horizontally to the rear of said second automatic transmission;
installing an extension housing by aligning a plurality of openings in said extension housing with said studs and axially sliding said extension housing onto said studs until said second threaded ends of said studs extend therethrough;
aligning a plurality of openings in said transfer case spacer support, which remains attached to said transfer case, with said studs and sliding said transfer case spacer support onto said studs until said second threaded ends of said studs pass therethrough; and
joining said second automatic transmission, extension housing, and transfer case spacer support by means of threaded fasteners installed on said second threaded ends of said studs.

28. The method of claim 27 further comprising the step of:
sealingly interposing gaskets between said replacement automatic transmission and said extension housing and between said extension housing and said transfer case spacer support.

29. The method of claim 27, wherein said first transmission is a General Motors Type 700-R4 automatic transmission, and said second transmission is a General Motors Turbo-Hydramatic 350 automatic transmission.

* * * * *